L. P. NORMANDIN.
PLOW.
APPLICATION FILED MAR. 11, 1920.
1,403,618. Patented Jan. 17, 1922.
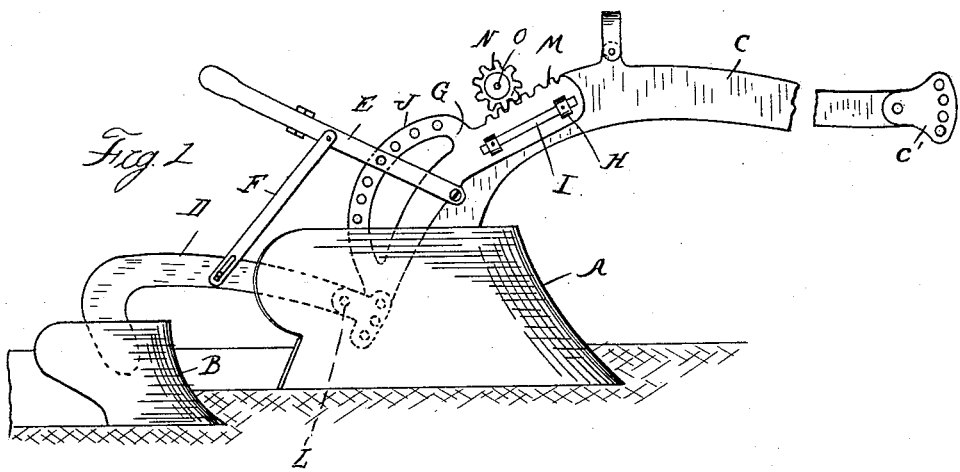
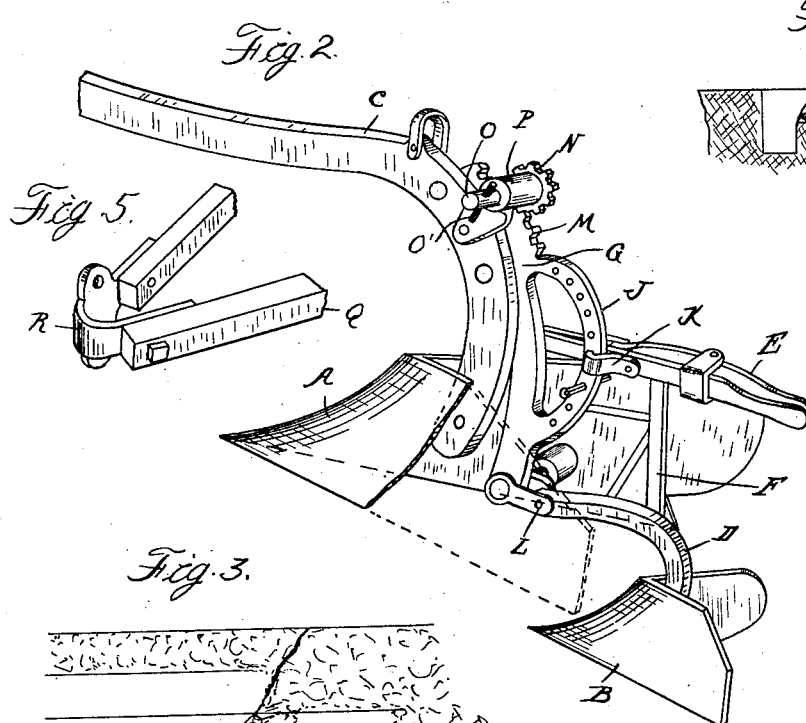
Inventor
Levi P. Normandin
By Whittemore Hulbert & Whittemore
Attorneys

UNITED STATES PATENT OFFICE.

LEVI P. NORMANDIN, OF HIGHLAND PARK, MICHIGAN.

PLOW.

1,403,618.  Specification of Letters Patent.  Patented Jan. 17, 1922.

Application filed March 11, 1920. Serial No. 364,882.

*To all whom it may concern:*

Be it known that I, LEVI P. NORMANDIN, a citizen of the United States of America, residing at Highland Park, in the county of Wayne and State of Michigan, have invented certain new and useful Improvements in Plows, of which the following is a specification, reference being had therein to the accompanying drawings.

The invention relates to plows and has for its object the obtaining of a construction in which a portion of the sub-soil is raised to a position nearer the surface, being still completely covered by the top soil. The invention therefore consists in various features of construction as hereinafter set forth.

In the drawings:

Figure 1 is a side elevation of the plow;

Figure 2 is a perspective view thereof;

Figure 3 is a plan view illustrating the manner of displacing the sub-soil as well as the top soil;

Figure 4 is a cross-section through a furrow;

Figure 5 is a perspective view showing the manner of attaching a guiding handle on the land side of the plow.

With the usual constructions of plow the top soil only is displaced. Certain constructions of plows have been heretofore used in which the sub-soil as well as the top soil is displaced, but these either maintain the same relative positions, or effect a commingling which interferes with the fertility of the soil. With my improvement the sub-soil is not commingled with the top soil, but is nevertheless raised in position so as to be nearer the surface of the ground. This will not interfere with the fertility of the soil as the roots of the plants are chiefly in the original top soil, but by reason of the fact that a portion of the sub-soil is nearer the surface, it will in time become fertile and will increase the value of the land.

Broadly described, my improved plow consists of a main plow section A for turning a furrow of standard width from the top soil, and an auxiliary plow section B for engaging the sub-soil. This auxiliary section is of lesser width than the main plow so as to turn its furrow upward upon the shelf of sub-soil uncovered by the main furrow. When the succeeding furrow is plowed, the top soil will fill both the trough formed by the removal of the sub-soil and will also cover the elevated sub-soil upon the shelf. The main plow A is attached to a suitable plow beam C provided with the usual clevis C' and the auxiliary plow is secured to a beam D which is raised or lowered in relation to the main plow by suitable mechanism, such as the lever E and link F. It is important to adjust the auxiliary plow to suit the condition of the soil, as in some cases the top soil is of much greater depth than in others. This adjustment cannot be effected by the lever E, as the change in angle of the beam D would cause the plow B to either dig in or run out from the soil. I have, therefore, provided means for raising and lowering the pivotal point of attachment of the beam D, which as shown consists in an adjustable member G secured to the beam C by clamping bolts H passing through a slotted bearing I. The member G carries the fulcrum for the lever E and also a quadrant J thereon, to which the lever is adjustably secured by a latch member K. The lower end of the member G is pivotally secured at L to the beam D. M is a rack face on the member G, which engages a pinion N upon a rotary shaft O journaled in a bearing P on the main beam C. The arrangement is such that by loosening the bolts H and by turning the shaft O by a handle O', the member G is raised or lowered to correspondingly adjust the position of the pivot L. When properly adjusted, the bolts H are tightened and will hold the parts rigidly in this position of adjustment.

For guiding the plow, suitable handles are provided and instead of placing these centrally of the beam, which would require walking in the furrow, I have arranged them to be offset on the land side of the plow. Thus, as shown, the handles Q are secured to a bracket member R, which is bolted to the beam C, and the handles are arranged at such an angle to the bracket that both of them will be upon the land side.

In use, after the plow is properly adjusted, a furrow is plowed, the main section A removing the top soil and the auxiliary section B removing a portion of the sub-soil and placing the same on the shelf formed by the remaining portion of the sub-soil. Each succeeding furrow will fill the trough and cover the raised sub-soil of the previous furrow, so that at the completion of the operation, the top soil only is visible. At the end of the season the elevated sub-soil will have gained fertility and as the same process is repeated each season, the value of the land is continually increased.

What I claim as my invention is:

1. A plow comprising a main plow section, a draft beam therefor, an auxiliary plow section of less length than the main section, a draft beam rigidly secured thereto, and provided with an adjustable pivot connection at the intermediate portion of the main draft beam, manually operable means for shifting and locking the adjustable pivot connection in desired relation to the main beam for raising and lowering the forward end of the auxiliary beam, and link and lever connections articulating the adjustable pivot connection with the auxiliary draft beam for holding the latter in desired adjustment.

2. A plow comprising a main plow section, a beam for drawing the same, an auxiliary plow section in rear of said main section and of less width, a beam for drawing said auxiliary plow section, a member adjustably secured to the main beam to which the auxiliary beam is pivotally secured, a rack face on said member, a pinion engaging said rack face, means for rotating said pinion to raise or lower the rack, thereby correspondingly raising or lowering the pivotal connection for said auxiliary beam, means for clamping said adjustable member in different positions of adjustment, a lever pivotally mounted on said adjustable member, a link connecting said lever with the auxiliary beam, and locking means carried by said lever for holding the same in different positions of adjustment.

3. A plow comprising a main plow section provided with a forwardly-extending rigidly attached draft bar, an auxiliary plow section of less width than the main section provided with a forwardly-extending rigidly attached draft bar, a member forming an adjustable pivot connection between the forward end portion of the auxiliary draft bar and the main plow, means on the main beam for shifting the pivot member into desired and adjusted position, a quadrant on the pivot member, a lever pivoted to the pivot member and adapted to adjustably engage the quadrant, and a link articulating the quadrant lever and the auxiliary draft bar.

In testimony whereof I affix my signature.

LEVI P. NORMANDIN.